E. D. LADY.
Straw Cutter.
No. 29,797.
Patented Aug. 28, 1860.
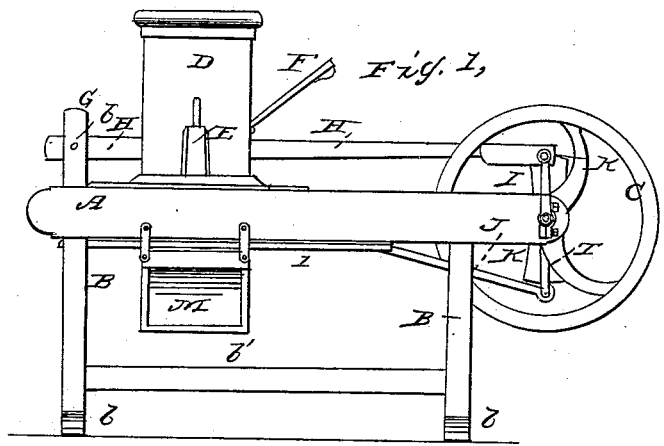
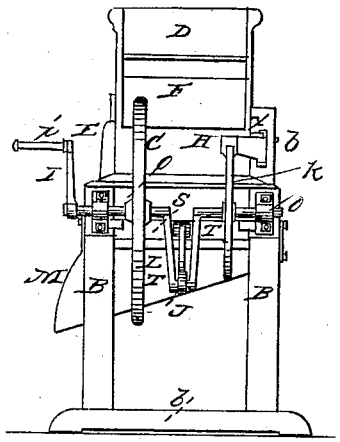
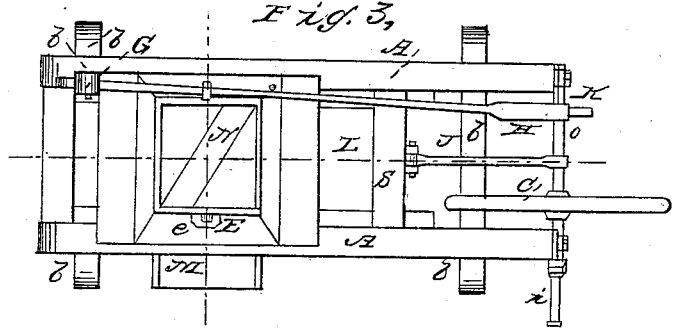
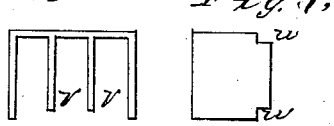
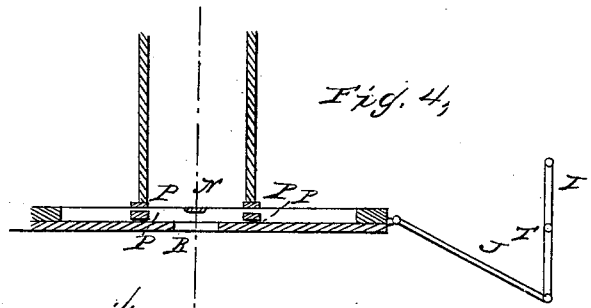
Witnesses:
Inventor:
E. D. Lady.

UNITED STATES PATENT OFFICE.

E. D. LADY, OF NASHVILLE, TENNESSEE.

STRAW-CUTTER.

Specification of Letters Patent No. 29,797, dated August 28, 1860.

*To all whom it may concern:*

Be it known that I, E. D. LADY, of Nashville, in the county of Davidson and State of Tennessee, have invented a new and Improved Straw and Corn Cutter of a Simple, Durable, and Superior Quality; and I do hereby declare that the following is a full and exact description thereof, reference being had to the accompanying drawings and to the letters of reference marked thereon.

The nature of my improvement consists in providing an ordinary straw cutter frame with an upright movable box with a door on one side to receive the bundle I want to cut, and close under this box passes the horizontal knife and traveling bottom just below it, moved along in the same frame in which the knife is fastened, and this bottom has a slit or hole just under the knife through which the cut off straw or material will fall into the shoe. The knife moves angular against and between two steels each way. The box is raised by a lever, which lever is raised by a cam on the shaft of the fly-wheel. The straw or bundle drops down as the box is raised, and dropped, and stops against the traveling bottom. This frame and bottom moves forward and backward by means of a crank motion which connects it with the fly-wheel-shaft.

But to enable others skilled in the art to understand and make use of my invention I will proceed to describe it more fully in reference to its operation and construction; and will therefore refer to accompanying drawings.

Figure 1 is a side-elevation of my straw and corn cutter. A, is the main frame with its legs B, feet $b$ and braces or connections $b'$. C is the fly-wheel. D is the box, open at the top and with its open receiving-door F, standard E, and tongue $e$, which latter is fastened to the box and fits in a corresponding groove in the standard, which again is fastened to the frame, allowing the box to slide up and down. G is another standard fastened to the frame to which the lever H is attached by its fulcrum $h$. I is the crank of the fly-wheel, with its handle $i$; K the cam fastened to the shaft of the fly-wheel which raises the lever (H) which raises the box (D). T is a forked crank on the same shaft which with the aid of J, the connecting rod, moves the traveling bottom L forward and backward when the fly-wheel is put into motion or turned. M is the shoe that conducts the cut feed into the desired place or into any attached receptacle.

Fig. 2, is an end-elevation, seen from the end of the fly-wheel on purpose to more plainly show the construction of some special parts, for example: T, the forked crank, J, the connecting-rod; K, the cam; H, the lever; X, the pin by which the box is raised by said lever; O, the shaft of the fly-wheel; S, the sash of the knife unto which the traveling bottom L is attached.

Fig. 3, is a plan view in which N, the knife, is shown in its angular position, and other parts already designated with its respective letters.

Fig. 4, is a sectional side-view of box, traveling bottom, knife, and sash, connecting-rod and cranks T and I. P represents pieces on which thin plates of steel are fastened, between which the knife passes and cuts each way. R is the opening through the traveling bottom through which the cut off feed falls into the shoe.

Fig. 5 is another sectional view of the box showing the grooves U in the frame in which the sash of the knife and traveling bottom is moving.

Fig. 6, is a representation of an extra box to be used in place of D when corn is to be cut. V V are partitions between which the ears of corn are dropped on one end.

Fig. 7, is a side view of same box. W is shoulders on which this box rests on the frame when placed on the machine.

When therefore a bundle of straw, oats or such matter is to be cut the door F is opened or let down the bundle put in the feed-box D, the door raised, the crank I turned, by which the forked crank T and its connecting rod J will move the sash S and the traveling bottom L backward and forward. The cam K then also raises the lever H, which by the little pin X lifts the feeding box, and when the cam passes from under the lever this box is dropped down suddenly, thereby jarring the bundle down to the traveling bottom, and thus about an inch lower than the point of the two edged knife (N) fastened to the upper part of the sash. The straw is forced against the pieces P which are covered with steel-edges and cut off as the knife passes between these two edges. The same thing takes place both in the forward and return trip of the knife and the cut off material, whatever it is falls through the opening R into the shoe M.

The superiority of this straw and corn cutter consists chiefly in the ease with which it cuts and the knife, cutting both ways, it cuts rapidly too.

I do not claim a horizontal knife, or a knife cutting between two steel edges, nor do I claim a movable bottom or the corresponding opening through this bottom under the knife, as I understand that these devices have been used before, but What I do claim and wish to secure by Letters Patent of the United States is—

The perpendicular feeding box D with its door F, pin X standard E and tongue e, for the purpose described or any substantially the same as here set forth.

E. D. LADY.

Witnesses:
R. A. NATHURST,
A. M. PINSON.